United States Patent

[11] 3,572,855

[72] Inventor Richard H. Weichsel
     Hudson, Ohio
[21] Appl. No. 771,201
[22] Filed Oct. 28, 1968
[45] Patented Mar. 30, 1971
[73] Assignee Apex Bearing Company

[54] FLUID SEALS
     7 Claims, 3 Drawing Figs.
[52] U.S. Cl. .................................................. 308/36.1,
                                                277/71, 308/187
[51] Int. Cl. ........................................................ F16c 33/78
[50] Field of Search............................................ 308/36.1,
         36.3, 181, 187.1, 187.2; 277/70, 71 (X), 73

[56]                References Cited
                UNITED STATES PATENTS
| | | | |
|---|---|---|---|
| 1,810,370 | 6/1931 | Ray | 308/36.3 |
| 1,957,054 | 5/1934 | Waldorf | 308/187 |
| 2,125,446 | 8/1938 | Hurtt | 377/82X |
| 2,299,119 | 10/1942 | Yeomans | 308/36.3 |
| 2,409,057 | 10/1946 | Meinke | 308/PM |
| 2,445,227 | 7/1948 | LeClair | 308/PM |
| 2,937,294 | 5/1960 | Macks | 308/A |
| 3,001,806 | 9/1961 | Macks | 277/96X |
| 3,113,810 | 12/1963 | Brusca | 308/187.1X |
| 3,286,792 | 11/1966 | Wall | 308/PM |
| 3,390,525 | 7/1968 | Spillmann | 308/36.3 |
| 3,093,382 | 6/1963 | Macks | 277/96X |

Primary Examiner—Manuel A. Antonakas
Attorney—John Mahoney

ABSTRACT: A fluid seal including a housing having a substantially circular outer wall and first and second spaced inwardly extending circular sidewalls, one of which is longer than the other and has a circular offset end portion to receive one end portion of a porous collar, the opposite end portion of the collar being secured to the inner periphery of the other sidewall to provide a circular channel, and means for passing a fluid through the channel and porous collar.

PATENTED MAR 30 1971

3,572,855

INVENTOR.
RICHARD H. WEICHSEL
BY John Mahoney
attorney

FLUID SEALS

My invention relates to fluid seals and more particularly to air seals for bearings. It also relates to the combination of a fluid seal and a bearing in which the seal not only prevents or minimizes the entrance of contaminating particles into a bearing but also aids in retaining the lubricant provided by the original manufacturer which is usually the most suitable for the load speed condition in which the bearing unit is designed to run.

In bearings for a shaft in which the bearing is of the roundway or linear action type and particularly of the rotating element type, such as ball, needle roller, or tapered roller bearings, considerably difficulty is encountered because contaminants which may be of a solid, liquid, or gaseous nature, enter the bearing during linear or rotative movement of the shaft, part of which bearing may be supported by the shaft and part of which may be supported by a machine housing. In many such cases, the lubricant may be lost or the entrance of contaminating particles, such as dirt, may increase the linear or rotational friction to a point where the temperature buildup changes the running clearance of the movable units and causes early failure.

In an attempt to overcome this deficiency, manufacturers of bearings have provided seals of the single or double lip type on one or both sides of the bearings. Such bearings, however, are not entirely satisfactory and failures frequently occur. In accordance with the present invention, I have provided a seal in the form of a pneumatic or hydraulic curtain which may be utilized with bearings of any desired type but which is particularly useful in association with bearings of the rolling element type which may at least be partly penetrable by air moving from the seal into the bearings.

It is therefore an object of the present invention to provide an improved means for producing a fluid seal by means of which the fluid may be passed around a movable member, such as a shaft, to provide a pneumatic or hydraulic curtain which prevents or minimizes the entrance of contaminating particles into a bearing for the shaft.

Another object of my invention is to provide a fluid seal, such as a vapor or liquid seal, which provides a pneumatic or hydraulic curtain around a shaft in combination with a bearing, part of which bearing is supported by and is movable with the shaft and part of which is supported by a machine housing which curtain aids in retaining the lubricant provided by the original bearing manufacturer which lubricant usually is the most suitable for the load speed condition in which the bearing unit is designed to run.

My invention will be better understood by reference to the accompanying drawings in which.

Figure 1:
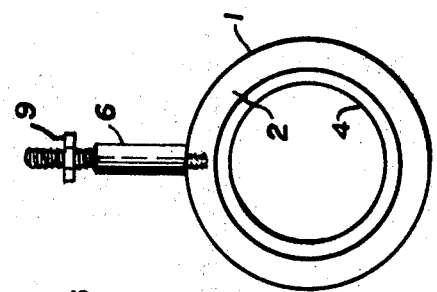
FIG. 1 is a side elevational view of my improved air seal.
Figure 2:
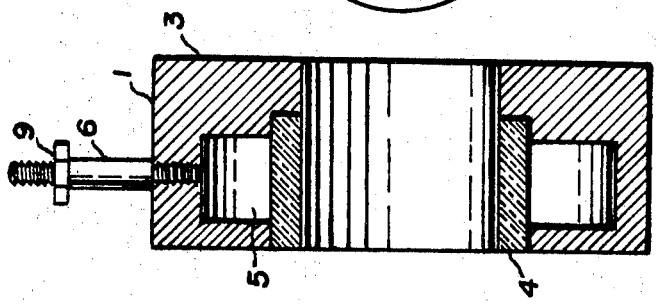
FIG. 2 is an enlarged cross-sectional view of my improved seal, showing the conduit means in elevation.

My improved seal may be made in any desired configuration. For instance, it may be designed for roundway or flatway linear sealing characteristics or it may be adapted with hydrodynamic spindle bearings as a seal for oil supported bearings in large spindles at high speed, such as in excess of 6,000 revolutions per minute on 6-inch diameter journals where contacting seals could not possibly be used because of the surface foot a minute rubbing characteristics. For purpose of illustration, my improved seal is shown in the drawing in combination with a bearing of the rotative element unit type and comprises a housing consisting of an outer wall 1 and sidewalls 2 and 3, the sidewall 3 being somewhat longer than the sidewall 2 and being provided with an offset circular portion to receive one edge of a circular collar 4 which is composed of a porous material and which is secured to the sidewalls and forms in conjunction with the sidewalls 2 and 3 a channel 5 for receiving a fluid which may be introduced into the channel in any desired manner, such as through holes or grooves. As shown in the drawing, a duct means 6 is provided, the inner end of which is threaded through the outer wall 1 of the housing and communicates with the channel 5. The housing including the collar 4 is circular in shape and surrounds a shaft 7 from which it is spaced and although I do not desire to limit the diametrical clearance between the collar 4 and the shaft 7, it may range from approximately 0.001 to 0.015 of an inch. A diametrical clearance of 0.002 of an inch over the greatest shaft dimensional size is usually satisfactory.

The maintain the collar 4 at the desired clearance from the shaft 7, the seal may be supported in any desired manner. As shown, the duct means 6 extends through an aperture in a machine housing 8 and is secured thereto in any desired manner, such as by a nut 9, the outer end of which nut is provided with suitable means, such as threads, to which a hose or conduit means leading from a suitable fluid supply is threaded. When air is utilized as the fluid, it should be comparatively clean; otherwise, it must be filtered. In my improved seal, the housing may be formed of a suitable metal, such as bronze, steel, or aluminum, or it may be formed of a plastic material, such as a phenolic condensation product.

The porous collar may be formed of any suitable material which affords sufficient feed therethrough to provide a substantially uniform seal between the collar and the shaft. For instance, the porous collar may be composed of a sintered copper-tin mixture, such as approximately 90 percent copper and 10 percent tin, or it may be composed of a sintered iron-copper mixture in which the iron constitutes approximately 90 percent and the copper constitutes approximately 10 percent, or the metal ingredients may be a mixture of iron, chromium and nickel in the proportions of approximately 10 percent to 25 percent chromium, 7 percent nickel and the remainder iron as in stainless steel. In such cases, the metal ingredients may be in the form of round or spherically-shaped pellets which may be pressed together and sintered at a sufficient temperature to fuse the metal having a lower or the lowest melting point. The rounded pellatized metals may also be substantially in the proportions present in Monel which consists of approximately two-thirds of nickel and one-third of copper. In forming the porous collar from the metals present in Monel, the rounded or spherically-shaped metal particles are pressed together and sintered at a sufficient temperature to fuse the copper. When formed in the manner specified, the porous collar consists of a network of tortuous interconnected passageways in which the pores may be present in an amount up to 95 percent by volume of the collar. Usually, however, the pores do not constitute more than approximately 20 percent to 25 percent by volume of the collar.

The collar may also be formed of a porous ceramic material, or of a native stone, which may be crushed and pressed together to from intricate tortuous passageways.

In preparing my improved air seal, and particularly when the porous collar is formed of sintered metal, the inside diameter of the sides of the housing which are engaged by the collar and the outside diameter of the porous collar should be substantially equal although they may each vary 0.00025 of an inch from its nominal diameter. In such case, the collar may be cooled to a temperature of approximately 0° F. and the housing may be heated to a temperature of approximately 250° F. The housing may then be slipped over the porous collar and the assembly allowed to attain room temperature. The ceramic material or native stone when utilized in forming the porous collar may be secured to the sides of the housing in substantially the same manner.

Although my improved seal may be used in conjunction with all types of bearings, such as ball, roller, barrel roller, or linear motion ball, precision spindle ball units and hydrodynamic spindle bearings, for purposes of illustration it is shown in combination with ball bearings including an inner race 10 carried by the shaft 7, and an outer race 11 supported in a machine housing with the usual balls arranged between the inner and outer races.

Figure 3:
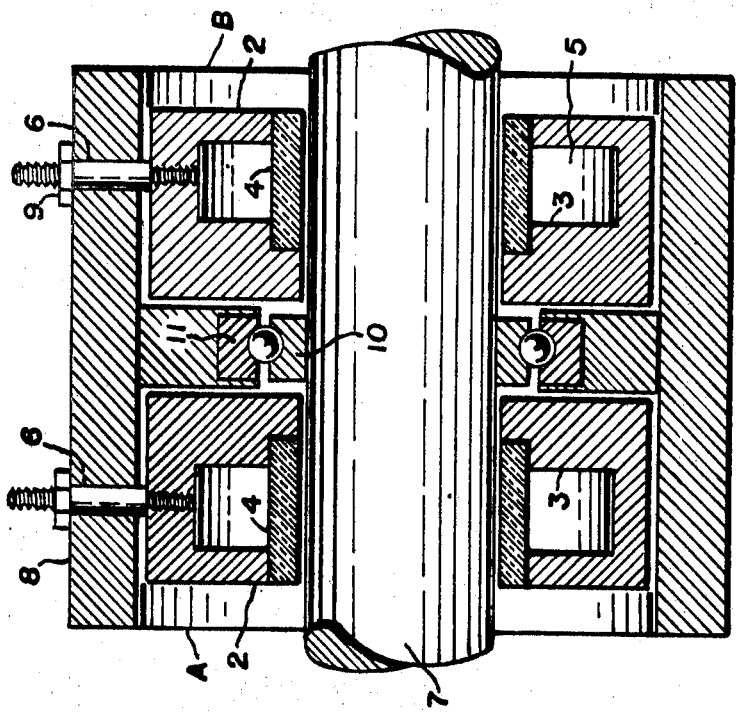
FIG. 3 is a cross-sectional view of a pair of such seals arranged on opposite sides of a bearing of the rotatable element type with the seal housing being shown exaggerated in size to more clearly emphasize the invention.

When a fluid, such as air, is passed through the seal surrounding the shaft at the left of the bearing as shown in FIG. 3, the air will form a pneumatic curtain around the shaft but in view of the fact that the sidewall 3 of the seal housing is longer than the sidewall 2, it is apparent that most of the air will be passed along the shaft toward the left while as shown in FIG. 3 of the drawing only a comparatively small amount will be passed to the right. The small amount of fluid passing to the right, however, will as a rule serve to prevent contaminating air from passing into the bearing in which case only a single fluid seal may be necessary.

Instead of suing only a single fluid seal A, however, a similar fluid seal may be arranged on the opposite side of the bearing which is designated by the letter B but in such case, the seal is reversed so that most of the fluid passing through the porous collar in seal B passes toward the right and only a small amount passes along the shaft into contact with the bearing.

When a single fluid seal, such as air, or a pair of such seals are used, it is apparent that only comparatively clean air is passed into contact with the bearing, and most of the air which is passed through the porous collar or collars is used to prevent ambient air containing contaminants from passing into the bearing. It is therefore apparent that the bearing will have a comparatively long life in service. It is also apparent that when a seal A or a pair of seals A and B as shown in the drawings are provided, oil may be used in the bearings which is applied to the bearings by the manufacturer and because the amount of air coming in contact with the bearing is small but clean, such oil may be retained in service and will not become contaminated with objectionable material, such as dirt, which may cause an early failure of the bearing.

It will of course be understood that in the event that one side of the bearing is closed, a single seal will be sufficient.

I claim:

1. The combination of a shaft, a bearing for said shaft, and a fluid seal, said seal including a housing having an outer curved wall, first and second spaced inwardly extending circular sidewalls with the second sidewall being longer than the first sidewall and arranged in proximity to one side of said bearing, said second sidewall being provided with an inner offset circular portion, and an annular porous collar arranged around said shaft and having one end portion arranged within and secured to the circular offset portion of the second sidewall and its opposite end portion being secured to the inner periphery of the first sidewall to provide an exposed end portion and a circular channel in said housing, means for maintaining said porous collar in a close but substantially uniformly spaced relation to said shaft, means for passing a fluid into the channel of said housing which fluid passes through said porous collar and forms a fluid curtain around said shaft, a small portion of which fluid flows along said shaft into contact with said bearing but most of which passes outwardly along said shaft and through the exposed end portion of said porous collar to prevent contaminated ambient air from entering said bearing.

2. The combination as defined in claim 1 in which the dimensional clearance between the shaft and the porous collar of said seal is such that the amount of fluid passing from said seal into the bearing is insufficient to materially dilute the oil originally supplied to the bearing.

3. The combination as defined in claim 1 in which the second sidewall of the housing is substantially thicker than the first sidewall and the diametrical clearance between said shaft and the porous collar of said seal ranges from approximately 0.001 to 0.015 of an inch.

4. The combination as defined in claim 1 including a machine housing, a portion of said bearing being supported by the machine housing and another portion being secured to said shaft, and means secured to said seal and the machine housing for maintaining said seal in a substantially uniform spaced relation to said shaft to form a fluid curtain around said shaft when fluid is passed through said porous collar.

5. The combination as defined in claim 4 in which the means for maintaining the seal in a uniformly spaced relation to said shaft includes a duct means having one end secured to the machine housing and its other end secured to said seal through which conduit means fluid may be passes into the channel of said housing and through said porous collar.

6. The combination as defined in claim 1 in which the fluid which is passed through said porous collar to form a fluid curtain around the shaft is comparatively clean air, part of which passes into contact with one side of said bearing but most of which is passed outwardly along said shaft and through the exposed end of the porous collar.

7. The combination as defined in claim 1 in which a second housing surrounds said shaft on the side of the bearing opposite to that of the first housing, said second housing including a substantially circular outer wall and first and second inwardly extending circular sidewalls with the first sidewall of the second housing being arranged in close proximity to said bearing and being longer then the second sidewall of the second housing, said first sidewall of the second housing having an inner circular offset portion, a circular porous collar having one end portion arranged in and secured to the circular offset portion of the first sidewall of the second housing and a second end portion engaging and being secured to the inner periphery of the second sidewall of the second seal to form an outer exposed end portion and a circular channel in the housing of the second seal, means for maintaining the porous collar of the second seal in a close substantially uniformly spaced relation to said shaft, and means for passing a fluid into the housing of the second seal and through its channel and porous collar which fluid forms a curtain around said shaft, a small portion of which fluid passes into contact with the side of said bearing opposite to that contacted by the fluid from the first seal but most of which passes along said shaft and through the exposed end portion of the porous collar of the second housing in a direction opposite to that of the first seal to thereby prevent contaminated air from entering the bearing and to preserve intact the original oil supplied to the bearing.